Patented Feb. 6, 1945

2,369,112

UNITED STATES PATENT OFFICE 2,369,112

MANUFACTURE OF METALS AND ALLOYS

Pierre Adeline, Sidcup, England

No Drawing. Application May 18, 1942, Serial No. 443,498. In Great Britain April 3, 1941

7 Claims. (Cl. 75—27)

This invention relates to the removal of silicon from metals or alloys.

Metals or alloys are sometimes produced by reduction of an ore or oxide or mixture of oxides by exothermic reaction with one or more reducing elements, usually aluminum but sometimes silicon or other element, which may be used as such or as an alloy. These processes present many advantages, but they nearly always lead to products containing more silicon than is desired.

The primary object of this invention is to provide a particularly advantageous method of reducing the silicon content of an exothermically reduced metal or alloy.

Another object of the invention is to produce a molten metal or alloy from an ore and to reduce its silicon content while it is still molten.

A further object of the invention is to produce ferro-manganese low in silicon direct from manganese ores.

In my invention, silicon in the molten metal or metals produced by the exothermic reaction of at least one reducing element with an oxidic silicon-containing material, usually an ore, is caused to react with one or more oxides of the metal or of a metal of the alloy to be produced. The silicon combines with the oxygen of the oxide or oxides and forms a slag, the metals of the oxides entering into the metal or alloy. By this means the silicon content can be substantially reduced or even entirely eliminated. It is to be understood that the reaction with the silicon constitutes a second stage in the complete process, i. e. the exothermic reaction is first carried on to yield a silicon-containing metal or metals, and then this molten mass is treated with the oxide or oxides.

As a rule use is made of one or more oxides of a metal already present in the molten mass. However, I may use an oxide or oxides of another metal which is desired as a constituent of the final alloy.

A temperature of 1200° C. is needed to make the reaction of silicon with oxygen take place. When it begins it is exothermic and is normally self-supporting. A particularly convenient way of starting the reaction is to heat the oxide or oxides by an exothermic reaction with an amount of aluminum insufficient to reduce the oxide or oxides completely.

The invention is particularly applicable to the production of ferro-manganese from ores by exothermic reaction with aluminum.

The oxide or oxides used should contain oxygen in excess of the amount theoretically required to react with the silicon to be removed. It is desirable to use an oxide rich in oxygen; for instance, in treating molten ferro-manganese produced exothermically, a mixture of oxides in which manganese dioxide predominates may be used, and this mixture may take the form of a manganese ore. If such an ore contains a substantial quantity of silica it may be diluted. Thus as manganese dioxide is most readily available in the form of a silicon-containing ore, it may be desirable to use a mixture consisting of equal parts of this ore and $Mn_3O_4$.

It is usual to add lime to the ore with which the aluminum reacts, but this has two important disadvantages. One of these is that it greatly reduces the life of the refractory linings of furnaces and crucibles and therefore leads to considerable upkeep expenses. The other is that it leads to the formation of a slag which contains substantial amounts of valuable metal or metals which are to be found in the final product. The yield is thus lowered. When the present invention is employed, lime may still be used but in a quantity sufficient to remove only some and not all of the silicon, and the silicon remaining in the molten metal or alloy may then be reduced further by means of the invention. By this means the disadvantages referred to above are largely avoided.

As an example, ferro-manganese may be produced from a mixture containing 820 lbs. of manganese oxides, 270 lbs. of aluminum (90% pure) and 200 lbs. of lime in the manner described in my application Serial No. 443,497 of even date herewith. This yields 370 lbs. of molten ferro-manganese containing 11.1 lbs. of silicon, i. e. having a silicon content of 3%. This is too high for many purpose and it is desirable to reduce it to 1%. This is difficult or impossible in the alumino-thermic reaction without materially decreasing the yield of ferro-manganese. Accordingly, while the ferro-manganese is still molten it is poured onto heated manganese oxides which react with the silicon.

The manganese oxides must be at a temperature in the order of 1200° C., and to bring them to this temperature an incomplete reaction with aluminum is effected in a crucible or ladle. The crucible or ladle may be lined with ore, which is preferably rich in metal and poor in oxygen, e. g. an ore consisting essentially of $Mn_3O_4$. The amount of aluminum used may advantageously be enough to reduce completely about half of the oxide. In the example given above the quantity of silicon to be reduced is 11.1 lbs. and as about 100 lbs. oxygen are required in practice to react with 144 lbs. silicon, the amount of oxygen required to reduce 11.1 lbs. silicon is 7.7 lbs. Assuming the oxides used to be a mixture consisting of equal parts of $MnO_2$ and $Mn_3O_4$ and allowing for an excess of oxide for use in liquefying the slag, the quantity of oxides which I use is 27½ lbs. to react with the silicon and a further 27½ lbs. to react with aluminum in order to raise the first 27½ lbs. of oxide to the required temperature. It is found best actually to divide the oxides into two such parts, the one being placed at the bottom of the crucible or ladle and the other (which is mixed with the aluminum) being placed on top of the first part. Thus, in the same example, I may place one quantity of 27½ lbs. oxide in the bottom of a warm ladle, after mixing it well with 2.25 lbs. of lime, and on top of this I place a mixture consisting of the other 27½ lbs. of oxide, 9 lbs. of aluminum to react with it, 4 lbs. of lime and 0.45 lb. of anhydrous potassium nitrate. The lime and potassium nitrate are materials for forming slag and for transferring impurities into the slag; the amounts used will, therefore, depend on the purity of the oxides used.

The part of the oxides that is mixed with aluminum is ignited to bring the contents of the crucible or ladle to a molten state before the ferro-manganese is poured into the crucible or ladle. The ignition may be effected by means of any mixture usually employed for such a purpose and consisting mainly, for example, of barium dioxide. The crucible or ladle is itself preheated and the precautions usual with such exothermic reactions are taken. When the reaction in the crucible or ladle is about complete, the contents of the crucible or ladle are in the liquid state and at a temperature of about 1200° C. The contents of the main crucible containing the ferro-manganese to be treated are then added. The slag in the main crucible is, of course, retained and care is taken to pour gently and steadily. Ignition by means of a separate igniting mixture is not always necessary, as the ignition may be effected by the molten mass itself. In any case, when the molten mass is added, a new reaction occurs in which the manganese oxides which have not to be reduced by the aluminum are reduced by the silicon in the ferro-manganese. This reduction also leads to the liberation of silicon from the oxides but the greater part of this is taken care of by the lime and goes into the slag. The refined ferro-manganese which is poured off contains less than 1% silicon.

By operating in the manner described above, it has been found possible to eliminate 90 and even 95% of the silicon contained in the ferro-manganese.

An example of another alloy that may be produced is one containing 40% manganese, 40% chromium and the balance iron. In treating the molten mass in the production of this alloy, chromic oxide may be used for the reduction or elimination of the silicon. The invention may, however, be used generally in the manufacture of such metals as manganese, tungsten, molybdenum, chromium, nickel, titanium, vanadium, zirconium, tantalum and so on from their ores and oxides, and of alloys of these metals.

I claim:

1. In the reduction of an oxidic silicon-containing material, effecting an exothermic reduction between said material and at least one reducing element to yield a molten mass containing silicon, heating at least one oxide by exothermically reacting it with an amount of aluminum insufficient to reduce it completely, and mixing said heated oxide and said molten mass to bring about a reaction between said oxide and silicon contained in said mass.

2. The method of producing exothermically a metal having a low silicon content from a metallic oxide containing material having a comparatively high silicon content which comprises reacting said oxide containing material with a reagent adapted to exothermically reduce said oxide containing material, whereby a molten metal having a substantial silicon content results, exothermically removing silicon from said molten metal by an additional amount of a metallic oxide containing material resulting from an exothermic reaction between said latter oxide containing material and an amount of a reagent adapted for exothermically reacting with only a portion of said latter oxide material.

3. The method of producing exothermically a metal having a low silicon content from an oxide ore having a high silicon content which comprises reacting said ore with a reagent adapted to exothermically reduce said ore and provide a molten metal, pouring said molten metal into a vessel containing an exothermic reaction mass resulting from the treatment of an oxide material in an amount substantially twice that required for reaction with the silicon content in the molten metal and a quantity of aluminum sufficient to react with approximately one-half of the said oxide material, to thereby provide a temperature at which said oxide material is exothermically reacted with silicon.

4. In the reduction of an oxidic silicon-containing material, effecting an exothermic reduction between said material and a reducing element adapted to react exothermically therewith to yield a molten mass containing silicon, heating at least one oxide material capable of exothermically oxidizing silicon by reacting said oxide material with an amount of a reagent adapted to exothermically react with the metallic oxide which is being reduced sufficient to reduce only a portion of said oxide material and to provide a temperature at which said oxide material is reactive with silicon, and mixing said heated oxide material and said molten mass to bring about a reaction between the heated oxide material and the silicon contained in said mass.

5. The method of exothermically producing a metallic material having a low silicon content from an oxide ore having a substantial silicon content which comprises reacting said ore with a reagent adapted to exothermically reduce the same and provide a molten metal mass, heating an oxide material by exothermically reacting it with a reducing agent sufficient in quantity to react with only a portion of said oxide material and to provide a temperature at which said oxide material is reactive with silicon, said agent being adapted to exothermically react with said oxide material, and mixing said heated oxide material and said molten mass to exothermically react said oxide material with the silicon contained in said mass.

6. The method producing exothermically a metallic substance having a low silicon content from a metallic oxide containing material having a substantial silicon content which comprises reacting said oxide containing material with a reagent adapted to reduce exothermically said oxide containing material and with an amount of lime insufficient to remove all of the silicon in said oxide containing material, whereby a molten metallic mass containing silicon results, heating a metallic oxide material by exothermically treating it with a reducing agent sufficient in quantity to react with only a portion of said oxide material and to provide a temperature at which said metallic oxide material is reactive with silicon, said reducing agent being adapted to react exothermically with said metallic oxide material, and mixing said heated metallic oxide material and said molten metallic mass to react exothermically the metallic oxide with the silicon contained in said mass.

7. In the exothermic production of ferro-manganese from a manganese ore, the steps which comprise mixing said ore with aluminum and an amount of lime insufficient to remove all the silicon in said ore, bringing about an exothermic reaction in said mixture to obtain silicon-containing ferro-manganese, in molten condition, heating a manganese oxide containing material by exothermically reacting it with an amount of aluminum sufficient to reduce only a portion of the oxide and thereby to provide a temperature of approximately 1200° C., and treating said molten silicon-containing ferro-manganese with said heated manganese oxide containing material to react exothermically the silicon and the oxide.

PIERRE ADELINE.